March 6, 1962 R. THIER 3,023,900
APPARATUS FOR DETECTING IMPERFECTIONS IN SHEET MATERIAL
Filed April 9, 1959 8 Sheets-Sheet 1
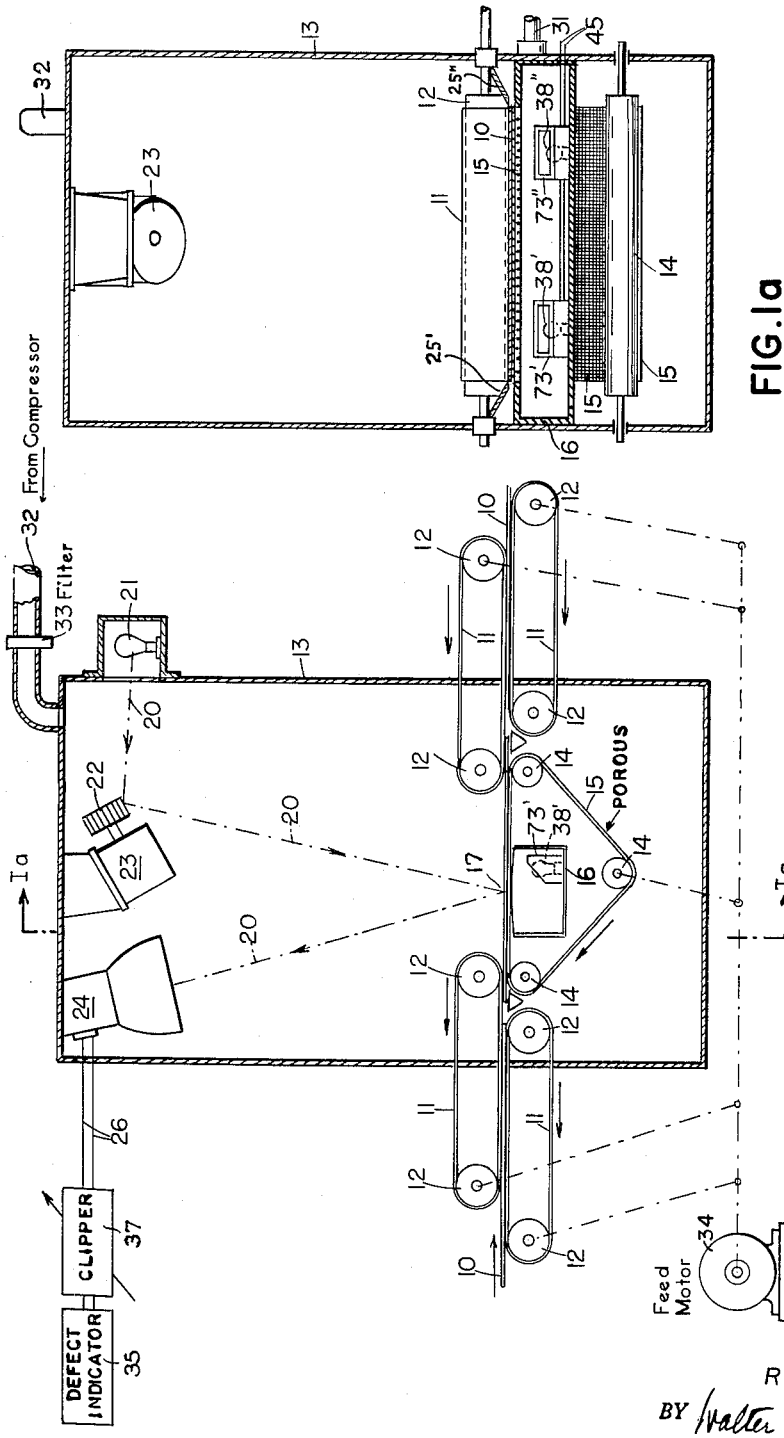
INVENTOR:
Richard Thier
BY Walter S. Bleston
ATTORNEY March 6, 1962  R. THIER  3,023,900
APPARATUS FOR DETECTING IMPERFECTIONS IN SHEET MATERIAL
Filed April 9, 1959  8 Sheets-Sheet 2
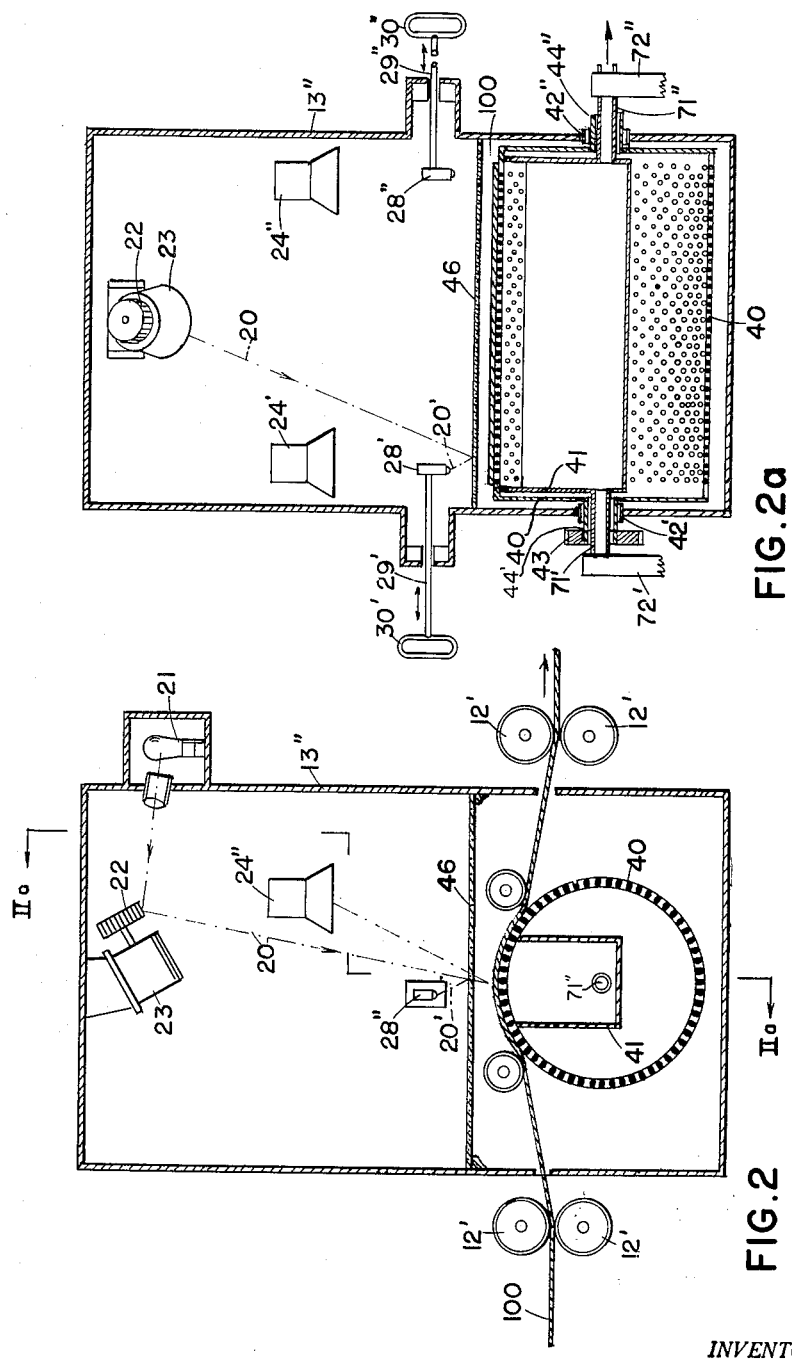
INVENTOR:
Richard Thier
BY *Walter S. Pleston*
ATTORNEY March 6, 1962 R. THIER 3,023,900
APPARATUS FOR DETECTING IMPERFECTIONS IN SHEET MATERIAL
Filed April 9, 1959 8 Sheets-Sheet 3
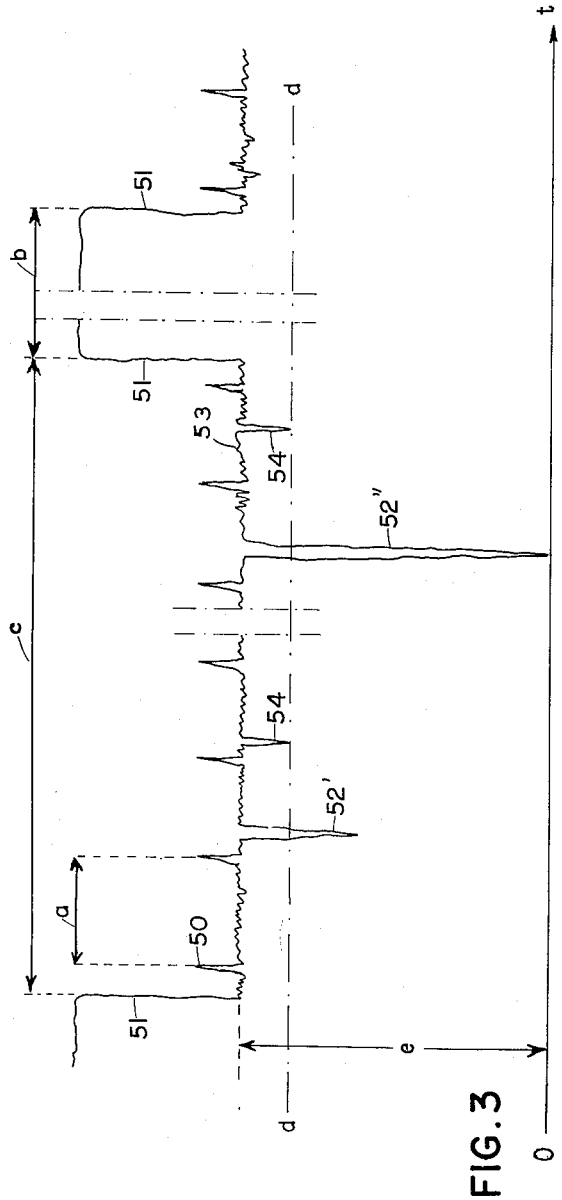
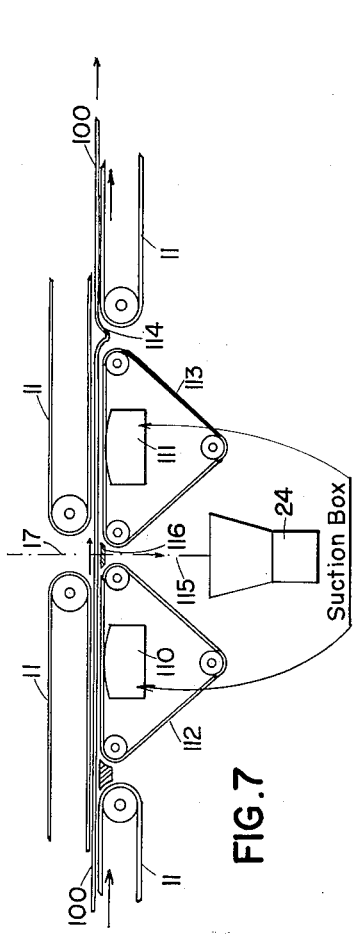
INVENTOR:
Richard Thier
BY Walter S. Bleston
ATTORNEY March 6, 1962
R. THIER
3,023,900
APPARATUS FOR DETECTING IMPERFECTIONS IN SHEET MATERIAL
Filed April 9, 1959
8 Sheets-Sheet 5
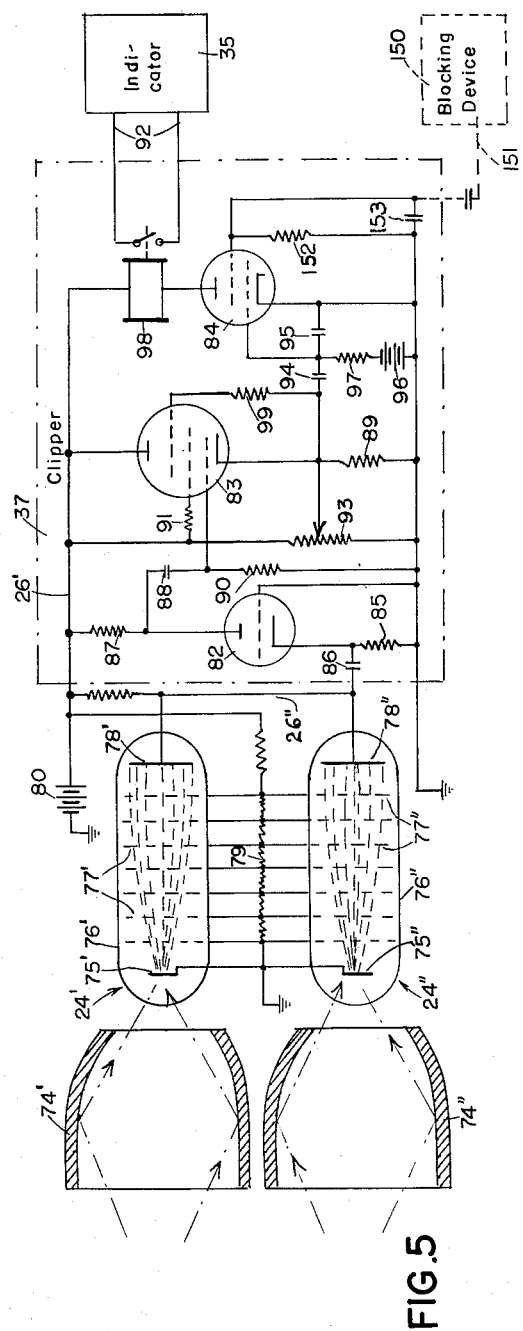
FIG.5
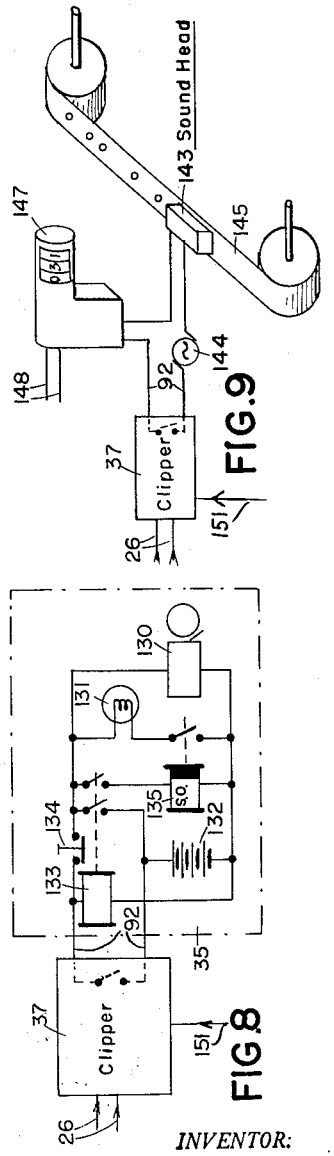
FIG.9
FIG.8
INVENTOR:
Richard Thier
BY Walter S. Heston
ATTORNEY March 6, 1962 R. THIER 3,023,900
APPARATUS FOR DETECTING IMPERFECTIONS IN SHEET MATERIAL
Filed April 9, 1959 8 Sheets-Sheet 6
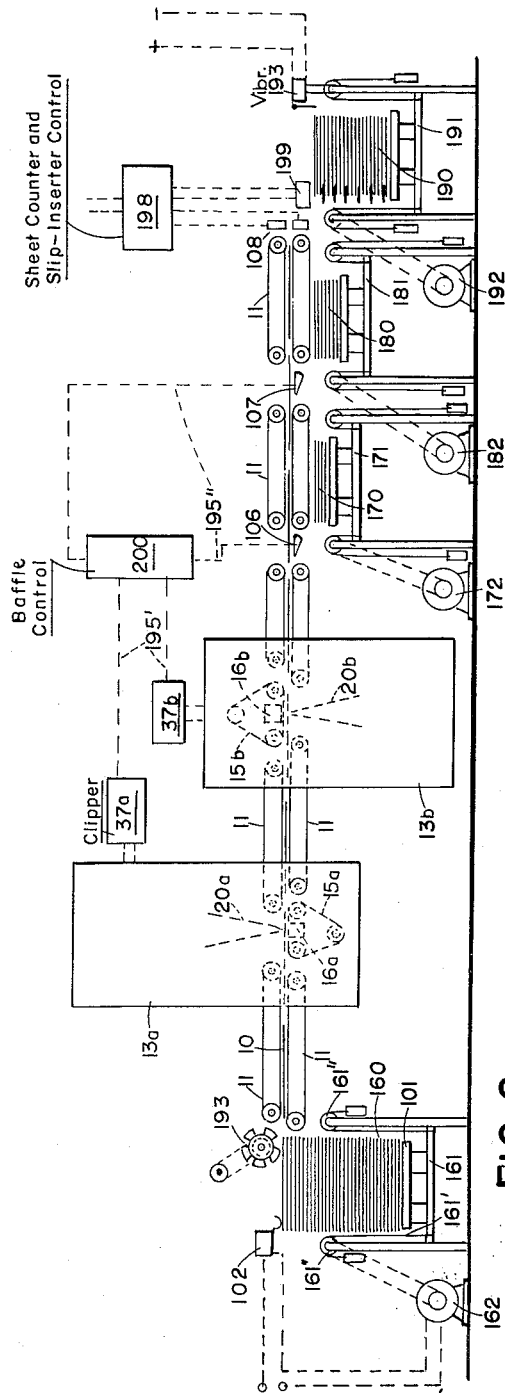
INVENTOR:
Richard Thier
BY Walter S. Bleston
ATTORNEY

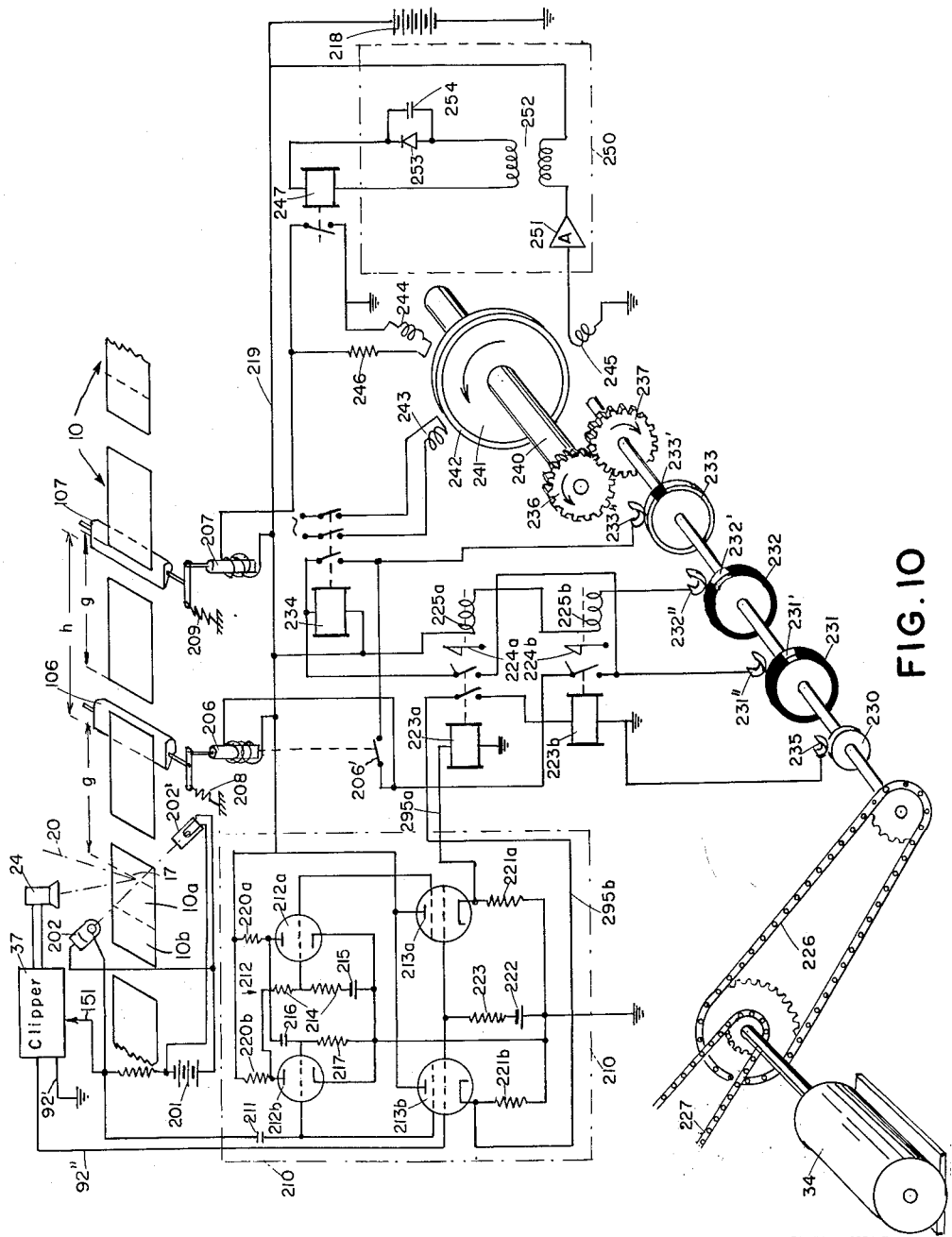

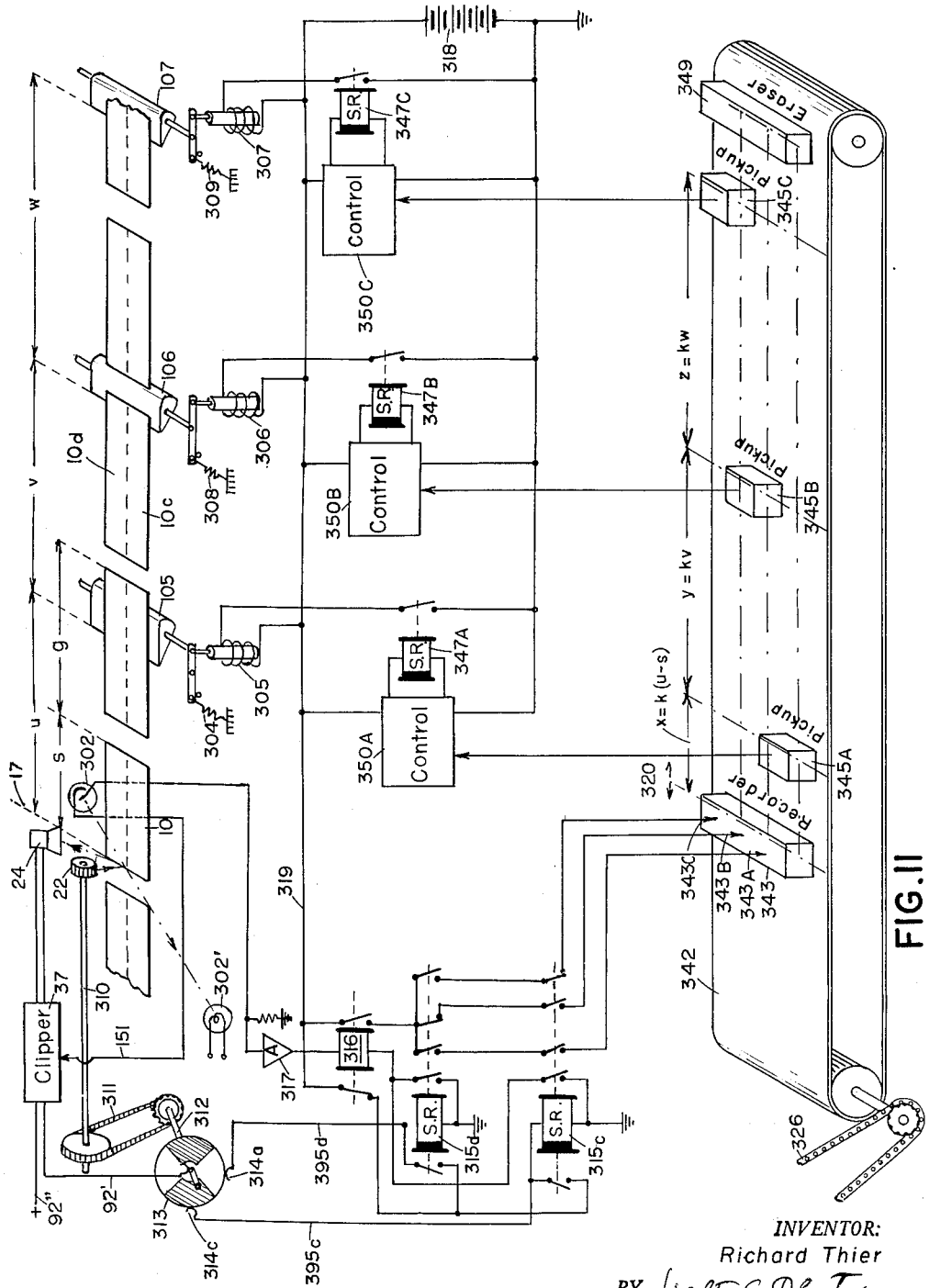

United States Patent Office 3,023,900
Patented Mar. 6, 1962

3,023,900
APPARATUS FOR DETECTING IMPERFECTIONS IN SHEET MATERIAL
Richard Thier, Büderich, near Dusseldorf, Germany, assignor to Feldmühle Papier- und Zellstoffwerke, A.G., Dusseldorf-Oberkassel, Germany
Filed Apr. 9, 1959, Ser. No. 805,237
Claims priority, application Germany Apr. 18, 1958
20 Claims. (Cl. 209—111.5)

The present invention relates to an apparatus for detecting spots, wrinkles, pinholes and other imperfections in a strip of sheet material such as paper, by means of an electro-optical scanning device.

In the manufacture of paper, cardboard, cellophane and other films or foils of sheet material it is desirable to ascertain the occurrence of defects before the material is stacked or wound on a roll, be it for the purpose of eliminating rejects at the source in order to save freight and storage space, be it with the view to alerting the operator to the necessity of adjusting the machinery so as to prevent further spoilage. In some instances it is also advantageous to be able to discriminate between sheets or sheet portions of different degrees of defectiveness so that specimens having minor imperfections, or having imperfections at certain locations only, may be segregated from the perfect or near-perfect goods and from the rejects for sale as "seconds" or for restricted use.

Devices heretofore proposed for the purpose described can supply these needs only imperfectly or not at all. One difficulty is the fact that a scanner operating with high power of resolution will also respond to minute surface irregularities, water marks, patterns and other characteristics of the sheet material which do not amount to defects, while, on the other hand, a device of low resolving power may pass up blemishes of small area but sufficient intensity to be objectionable to the human eye.

A principal object of the present invention is the provision of means for photoelectrically scanning a sheet of predetermined width, by either reflection or translumination, in a manner insuring detection of even small imperfections without giving rise to false alarms in response to normal deviations from precise uniformity.

A more particular object of this invention is the provision of means for so scanning a series of sheets that no defect is registered during the scanning of the gap separating successive sheets.

It is also an object of the present invention to provide means controlled by a photoelectric scanner for automatically directing successive pieces of sheet material to different destinations, depending upon the presence or absence of defects or other markings thereon and/or the location of such markings.

An important feature of this invention is the provision of a clipper stage which cuts off all imperfection signals below a preselected amplitude so that only defects exhibiting a predetermined minimum degree of blackness will be indicated. The photoelectrically produced signals are, for this purpose, amplified directly, i.e. without differentiation or similar distortion, to provide the desired output.

The invention is applicable to the testing of both continuous webs and discrete sheets. In the latter case there will be provided, in accordance with another of its features, an auxiliary light source adapted to illuminate a photosensitive device through the gap occurring between successive sheets for the purpose of suppressing all fault indications during the passage of such gap.

A further important feature of this invention resides in the provision of an optical scanning unit including a movable reflector, such as a multifaceted rotatable mirror, in combination with a light source whose rays are focused into a beam by a stationary array of lenses and diaphragms; as the beam is directed by the movable reflector onto the surface of the sheet material to be tested, the luminous spot thereon remains in sharp focus throughout its sweep across this surface since, with the arrangement described, the length of the light path (and, therefore, the focal length of the focusing means) can be made as great as desired without unduly encumbering the apparatus. With large focal length, as will be readily understood, the unavoidable changes in the length of the light path during scanning will be only a small fraction of this focal length so that defocusing will be at a minimum.

Another feature of the invention resides in the provision of means for maintaining the beam-swept surface of the sheet material at a fixed distance from the light source in order to maintain the sharp focusing desired. For this purpose there is provided, in a preferred embodiment, a suction box spanned on its open side by a perforated or otherwise air-permeable supporting member for the sheet material; if this material consists of individual sheets successively fed with a certain separation onto the support, this suction box may contain the aforementioned auxiliary light source.

The above and other objects, features, and advantages of the invention will become more fully apparent from the following detailed description of certain embodiments, reference being made to the accompanying drawings in which:

FIGURE 1 illustrates, partly in longitudinal section and partly in diagrammatic form, an apparatus embodying the invention;

FIGURE 1a is a cross section taken along line Ia—Ia of FIGURE 1;

FIGURE 2 is a sectional view of an apparatus generally similar to that of FIGURE 1 but representing a modified embodiment;

FIGURE 2a is a cross section taken along line IIa—IIa of FIGURE 2;

FIGURE 3 is a graph serving to illustrate the mode of operation of an apparatus according to the invention;

FIGURE 5 is a circuit diagram of the electrical system associated with an apparatus according to the invention;

FIGURE 6 is a somewhat diagrammatic view of a more elaborate apparatus of the character shown in FIGURE 1, including a distributor for the scanned sheets;

FIGURE 7 is another diagrammatic view illustrating a further modification;

FIGURES 8 and 9 are diagrammatic views of different types of indicators adapted to be used with the apparatus of FIGURES 1, 2, or 7;

FIGURE 10 is a circuit diagram of a system for controlling a distributor of an apparatus according to the invention as generally illustrated in FIGURE 6; and FIGURE 11 is a similar circuit diagram for a modified distributor.

Figure 4:
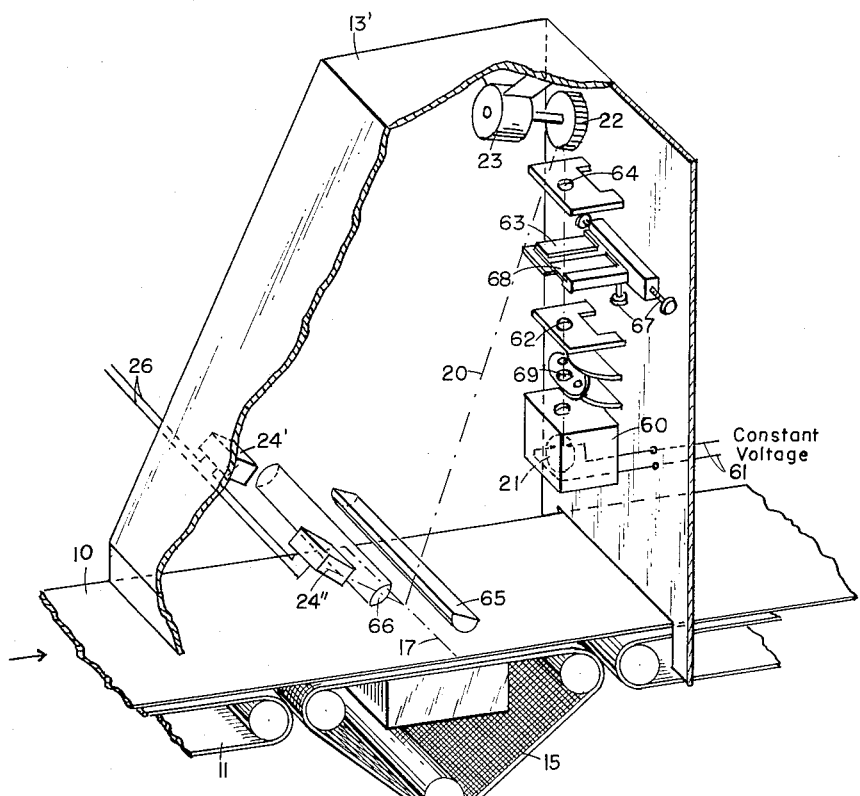
FIGURE 4 is a fragmentary perspective view of an apparatus similar to that shown in FIGURE 1.

Reference will be made to FIGURES 1 and 1a which show a housing 13 provided with entrance and exit apertures for the passage of individual sheets 10. The sheets 10 are advanced through the housing 13 by means of a transporting mechanism comprising several pairs of conveyor belts 11 and, within the housing, an endless supporting band 15. The conveyor belt 11 and the supporting band 15 are synchronously driven by a motor 34 operatively coupled with their mounting rollers 12 and 14, respectively.

The band 15 passes across the open top of a suction box 16, into which opens the entrance end 31 of an air aspirator, now shown. Band 15 should be sufficiently permeable to enable the aspirated air to act upon each sheet 10 in such a manner as to draw it flat against the upper horizontal run of the band. The band 15 may comprise, for example, a porous fabric, a perforated sheet or a wire netting. Also, its outer surface should form a contrasting background with respect to the sheet material for a scanning beam 20 which emanates from a light source 21, and, after reflection by a multifaceted mirror 22 rotated by a motor 23, impinges upon the sheet at 17. Thus, if the sheet 10 is white or lightly colored as will usually be the case, the band 15 and preferably also the interior of box 16 should be dark. It is, however, also possible to scan colored sheets against a background of complementary colors, the beam 20 then being preferably monochromatic and of a color corresponding to either that of the background or that of the sheet. As a result of this arrangement, the beam 20 reflected at the scanning line 17 (see also FIGURE 4) toward a photoelectric transducer 24 will undergo a sharp variation in intensity whenever a tear or a pinhole in the sheet 10 passes that line.

The purpose of mirror 22 is to cause a rapid sweep of the beam along the transverse line 17 at a rate which is high with respect to the speed of advance of the sheets. For high-resolution scanning it is necessary that the beam be focused sharply upon a line closely above or below the transverse line 17, an optical system suitable for this purpose being illustrated in FIGURE 4 which shows the light source 21 mounted in an enclosure 60 within the modified housing 13'. From the light source 21, which is electrically energized over leads 61, the beam 20 passes through an optional color filter 69 into a focusing objective here shown as a pair of lenses 62, 64 separated by a light gate in the form of a slot diaphragm 63, 68. This diaphragm is adjustable by screws 67 to limit the width of the beam in the direction of the advance of sheet 10 as well as in the direction perpendicular thereto by cutting off marginal light rays from source 21. Next, the beam 20 after reflection at mirror 22 traverses a cylindrical lens 65 which extends transversely across the moving sheet and concentrates the beam to the width required on the line 17. Thus, a small light spot of great brightness and of a predetermined size will travel across the surface of sheet 10 in repeated sweeps along line 17, the speed of mirror 22 and of conveyor 11 being advantageously so correlated with each other and with the width of the light spot that successive lines of the scanning beam just touch one another or will overlap.

As the surface of the sheet 10 will generally not have a mirror finish, the impinging light will be reflected by it in a more or less diffused manner. The reflected light as collected by another cylindrical lens 68 and directed toward the transducer 24 shown in FIGURE 4 to comprise a pair of photoelectric receivers 24', 24''. These receivers are connected in series, by way of conductor 26, to a clipper stage 37 (FIGURE 1) controlling a defect indicator schematically represented at 35. This indicator may take a variety of forms as more fully described hereinafter.

The housing 13 or 13' is connected to a source of compressed air, as indicated at 32, in order to create a slight overpressure in the upper part of the housing to prevent any entrance of dust. For the same purpose a filter 33 is advantageously inserted in the pressure duct 32 in order to prevent the result of the photoelectric examination from being falsified by dust particles settling on the lenses.

The lamp 21, which may be a high-pressure tube with mercury-vapor or xenon filling, is advantageously energized from a constant-voltage source, such as a special generator driven at constant speed, in order to produce a steady, flicker-free beam. The provision of two or three series-connected photoelectric receivers 24', 24'' will be advisable for practical reasons because of the higher efficiency attainable from the light reflected from line 17.

Highly reflective strips 25' and 25'', shown in FIGURE 1a but omitted from FIGURE 1 for the sake of a clearer illustration, extend within housing 13'' alongside the path of the sheet material to be scanned in order to direct the light of beam 20 toward the receivers 24', 24'' as the beam sweeps past the longitudinal edges of the sheet. With this arrangement an indication of a defect will not be given by the scanner if the angle of sweep of each beam 20, corresponding to the angular spacing (e.g. 18°) of the facets of mirror 22, extends somewhat beyond the width of the sheet; it is merely necessary that a new beam impinges upon one of the strips (e.g. 25') while the previous beam still impinges upon the other strip (e.g., 25'').

In FIGURES 1 and 1a it is assumed that the material to be tested is in the form of individual successive sheets 10 of limited length and not of a rather long or endless web as in FIGURES 2 and 2a. For this reason it is necessary to eliminate another source of false signals, namely, the gap existing between successive sheets 10. This is accomplished by the provision of two auxiliary lamps 38', 38'' in the interior of suction box 16, these lamps being energized through wires 45 and being surrounded by shields 73', 73'' which train their light toward the receiver 24. Whenever a space separating two sheets 10 passes the scanning line, virtually all reflection of beam 20 ceases, but the light of lamps 38', 38'' reaches the receiver 24 to maintain the voltage output of the receiver above the level attained in the scanning of a perfect sheet. It should be noted that a small hole in a sheet 10, which might fortuitously occur in the direct line of sight between one of the lamps 38', 38'' and the receiver 24, will still be detected by the apparatus since the amount of light reaching the receiver from one lamp only will be far less than that normally reflected toward it by a perfect sheet and will, in the absence of a simultaneous excitation by the other lamp, give rise to a defect-indicating signal in the receiver output. It will be understood that the two transversely spaced lamps 38', 38'' are representative of any radiant source adapted to emit light from a plurality of points along the scanning line 17, including a single elongated lamp extending along such line.

In a typical embodiment, the rotary mirror 22 may be driven at 3,000 r.p.m. and may have 20 facets so as to perform 1,000 scanning sweeps per second. If the sheet 10 travels at a speed of 2 meters per second, its advance between two consecutive sweeps will be 2 mm. so that the luminous rectangular spot produced by the beam 20 should have a size also not less than 2 mm. in the direction of travel of the sheet. If greater resolution is desired, the luminous spot may be narrowed with simultaneous reduction of conveyor speed and/or acceleration of the mirror. Suitable speed-changing means, not shown, may be inserted for this purpose between mirror 22 and motor 23 and/or between rollers 12, 14 and motor 34. With the mirror 22 coupled directly to a high-speed motor 23 as shown, a stabilizing force will be exerted upon the entire scanner assembly by the gyroscopic effect of such unit rotating at, say 3,000 to 9,000 r.p.m.

The color filter 69 may be used, especially in combination with a lamp 21 emitting white or polychromatic light, in order to produce monochromatic beams of a color contrasting with the color of the sheet material being scanned. This filter will also be useful wherever it is desired to scan a sheet for imperfections of one or more specific colors.

Reference will now be made to FIGURES 2 and 2a which show, within a housing 13'', the elements 22, 23, 24' and 24'' of the photoelectric scanner described in conection with FIGURES 1 and 4. The embodiment shown in FIGURES 2 and 2a especially is designed for testing a continuous web of sheet material 100. This web 100 is fed continuously in one direction by feed rollers 12'. The triangular supporting band 15 has, however, been replaced by a perforated drum 40, the trunnions 44', 44" of which are journaled in the lateral housing walls by means of bearings 42', 42". Drum 40 is driven from the feed motor 34 (FIGURE 1), in step with the rest of the transporting mechanism, via a transmission here indicated schematically as a gear 43 mounted on the left-hand trunnion 44'. A pair of horizontal tubes 71' and 71", held in posts 72' and 72", pass through the trunnions 44', 44" and serve as supports for a suction box 41 fixedly held within the rotating drum 40, the interior of the box being connected with an air aspirator (not shown) through the tube 71".

FIGURES 2 and 2a further disclose a pair of photoelectric devices 28' and 28" similar to but of a smaller size than the receivers 24' and 24". These devices replace the reflective strips 25', 25", respectively. They are mounted at opposite points of the housing 13", transverse to the direction of travel of web 100, on rods 29', 29" which may be shifted from the outside by handles 30', 30" to adjust the position of devices 28', 28" in a horizontal direction. Each photoelectric device 28' and 28" is adapted to receive a beam of light 20' reflected from the surface of a glass plate 46 which is disposed above web 100 and seals the upper part of housing 13" to protect the latter from any entry of dust. If beam 20 in its sweeping movement reaches a point where its reflected beam 20' impinges upon one of the devices 28' or 28", the current produced therein is transmitted to clipper 37, shown in FIGURE 1, for interrupting the operation of the latter until a beam impinging upon the other photoelectric device 28' or 28" restarts such operation. The adjustability of devices 28' and 28" has the advantage that webs of different widths may be tested in the same apparatus without alteration thereof, and that any part of the total width of a web may be tested.

If the photoelectric devices 28', 28" are applied in the embodiment according to FIGURE 4, the flat surface of lens 65 can also be used for reflecting the beam 20 to these devices.

The mode of operation of a scanner as shown in FIGURES 1 and 1a, and of an associated clipper stage 37, is illustrated in FIGURE 3 in which the signal amplitudes in the output circuit 26 of the scanner are plotted against time. The time axis or abscissa $t$ represents the represents the line of zero amplitudes occurring when no light reaches the receiver 24 in FIGURE 1 or the receivers 24' and 24" in FIGURES 2 and 2a. Normally, however, the scanner will produce an output voltage 53, centered on a level $e$ above zero, the wavy character of which is due to the inherent irregularities of the sheet material representing the so-called noise level of the specimen to be tested. The positive spikes 50 are the result of enhanced reflection at marginal strips 25', 25" and occur at regular intervals $a$, e.g. of one millisecond each, representing the duration of a line scan. The larger positive peaks 51 occur at the inter-sheet gaps, owing to the provision of the lamps 38', 38", and may have a duration $b$ of 0.01 sec. if the sheets follow one another with a spacing of 2 cm. With sheets 1 meter in length, the separation $c$ between peaks 51 would represent approximately half a second.

A horizontal line $d$ represents the cutoff amplitude of the clipper stage and should be so positioned between the levels 0 and $e$ as to avoid the normal oscillations 53 as well as the small negative spikes 54 resulting from minor imperfections which are not considered as defects. If, however, a larger negative spike occurs as illustrated at 52' and 52", then the clipper stage 37 will produce an output to operate the defect indicator 35 in a manner appropriate to give an alarm indication, to record the occurrence and/or to take corrective measures.

From the foregoing description it will be understood that the defect-indicating pulse 52" reaching zero level may be the result of a dark spot on sheet 10, the size of which is as great or greater than the predetermined size of the light spot on this sheet. If the dark spot on sheet 10 is of a smaller size such, however, as still to be regarded as a defect, the corresponding pulse will not reach zero level as shown by spike 52'. It is thus of decisive importance for the sensitivity of the apparatus and the resulting measurements thereof that the light spot be made of a definite predetermined size and of a uniform high light intensity. The size of the light spot should be in accordance with the smallest defect to be recorded so that this defect will diminish the intensity of the light received by the photo-electric device to such an extent that a recordable signal will be attained. Of course, the effect of a hole at a location other than one directly registering with one of the lamps 38', 38" will be the same as that of a dark spot on the surface of the sheet if a background of contrasting color be provided; the effect of holes in line with these lamps has been discussed above. Obviously, this applies to measurements carried out on sheets as well as on continuous webs. With the clipper stage 37 adjusted to position the line $d$ at a suitable level, the effect of both signals 52', 52" upon the indicator 35 will be the same. These signals, apart from being amplified, may then be converted, for example, by condensers, to be able to energize a relay.

Reference is now made to FIGURE 5 for a description of the mode of operation of the transducers 24', 24" and the associated clipper stage 37.

Each transducer 24', 24" is shown in FIGURE 5 to comprise a respective light shield 74', 74" adapted to prevent any light from other sources from reaching the photocathode 75' 75" of an associated photomultiplier tube 76', 76". Each of these tubes in provided, in a manner well known per se, with a series of secondary-electron-emissive intermediate electrodes 77', 77" which, together with a collector anode 78', 78", are biased progressively more positively with respect to the cathode by means of a voltage divider 79 which is connected to the positive terminal of a high-voltage battery 80. The anodes 78', 78" are connected to each other and to the clipper stage 37 by a conductor 26". The clipper stage 37 is shown to comprise a primary amplifier 82, a pentode 83 representing the clipping device proper, and a secondary amplifier 84. Amplifier 82, shown as a triode, has a grounded grid and a cathode connected to ground via a resistor 85 and to the output lead 26" of photomultiplier 76" via a coupling condenser 86; the plate of this tube is connected to high-voltage lead 26' by way of a resistor 87 and to the control grid of clipper pentode 83 through a coupling condenser 88.

Tube 83, connected as a cathode follower, has its cathode and its control grid grounded through respective resistors 89 and 90. Its screen grid and its suppressor grid are connected, in the usual manner, to plate potential on lead 26' and to cathode potential at the ungrounded terminal of resistor 89 by way of resistors 91 and 99 respectively. The tube is biased beyond cutoff by a potentiometer 93, the slider of which is connected to the cathode of the tube and, via a coupling condenser 94, to a grid of amplifier tube 84 shown as a tetrode. This latter grid, connected to the grounded cathode of tube 84 through a condenser 95, is biased to cutoff through a battery 96 in series with a resistor 97. A relay 98 in the plate circuit of tube 84, energizable from battery 80 when the tube is conductive, has a single armature and front contact included in an operating circuit 92 for the indicator 35.

The potentiometer 93, which controls the sensitivity of clipper tube 83, is adjustable to vary the location of cut-off level $d$ in FIGURE 3. With normal illumination of either or both photocathodes 75', 75", tube 82 will be conductive and tubes 83, 84 will be cut off. When the scanner encounters a dark spot of sufficient contrast, the voltage drop across cathode resistor 85 is momentarily increased to reduce the conductivity of the tube and to apply to the control grid of pentode 83 a positive voltage pulse sufficient to cause the flow of current through its cathode resistor 89. In view of the constant-current characteristic of a pentode, the positive pulse thus applied to the lower grid of tube 84 will have an amplitude substantially independent of that of the original pulse received by tube 82. Tube 84 thereupon conducts and energizes the relay 98 to transmit a defect signal to the indicator 35.

The second grid of tube 84 is provided for the purpose of enabling the clipper stage 37 to be temporarily inactivated in response to a signal from a blocking device 150 which may be provided in lieu of the auxiliary lamps 38′, 38″ (FIGURES 1 and 1a) for the purpose of suppressing the defect signal during the passage of a gap between successive sheets. Thus, a lead 151 from such blocking device, to be described in detail hereinafter, is shown tied to this latter grid which is normally biased at ground potential by way of a resistor 152 in parallel with a condenser 153.

In FIGURE 6 there is shown the housing 13a of a first defect detector, similar to that illustrated in FIGURE 1, and the housing 13b of a second detector inverted relative to the first detector but identical therewith. The scanning devices of these detectors are represented merely by the beams 20a, 20b impinging from above and from below, respectively, upon a succession of sheets 10 which are drawn against supports 15a, 15b by suction boxes 16a, 16b as previously described. The sheets 10 are taken from a stack 160 which is stored on a pallet 101 resting on a vertically movable platform 161 which, in turn, is suspended on chains 161′ movable on sprocket wheels 161″ by a motor 162. A micro-switch 102 controls motor 162 to bring the top sheet of stack 160 to the proper level so that this sheet can just be gripped by a rotary feeder 193 which moves it into engagement with the first set of conveyor belts 11. Feeder 193 is shown as a generally polygonal roller coupled, over a suitable transmission indicated only schematically, with the motor 34 so as to maintain the proper spacing between the sheets 10 as they are successively gripped by the belts 11. After traversing the housings 13a and 13b, the sheets move toward a distributor comprising two or more platforms associated with one or more baffles. FIGURE 6 illustrates, for example, three platforms, 171, 181, and 191, and two associated baffles 106 and 107. The distributor is controlled by the output of the clipper stages 37a and 37b, respectively associated with the detectors in housings 13a and 13b, via transmission paths 195′, 195″ through which a baffle-control unit 200 is connected to both clipper stages 37a and 37b and also to both baffles 106, 107. The unit 200 serves as a storage device in order to delay the response of the baffle 106 or 107 to a defect signal from the associated detector until the defective sheet approaches the baffle.

A system of this type can be used generally for the selective switching of successive sheets to several platforms in dependence upon the presence or absence of a defect and the nature or location of any defect encountered. The particular arrangement of FIGURE 6, however, it is intended for testing a stack 160 of defect sheets which by a similar previous testing operation have been segregated from the perfect sheets, and for separating them from each other according to three different types of defects. For this purpose baffle 106 will be turned upwardly in response to detection of imperfections on both sides of a sheet, and baffle 107 will be similarly pivoted in response to a defect occurring on the upper sheet surface. As a result, platform 171 will receive a stack 170 of sheets defective at their upper and lower surfaces or having through-going imperfections, such as holes, platform 181 will receive a stack 180 of sheets which are defective only on their upper surface, and platform 191 will accumulate a stack 190 of sheets having defects only on their lower surface and passing over both baffles.

The sheets of stacks 170, 180, and 190 on respective platforms 171, 181, and 191 are preferably placed in proper alignment by vibrators 193 of any suitable type known in the art, of which only the one associated with the last stack 190 has been illustrated. The stacks 170, 180 and 190 may also be provided with sheet counters 198 (only one shown) of a type known per se, adapted to be triggered by the oncoming sheets; it will be apparent that, in the case of stacks 170 and 180, these counters could also be controlled by the respective baffles 106, 107 or the control unit 200. Each counter may also actuate a device 199 for inserting colored or otherwise distinctive marking slips 109 into the respective stack after a predetermined number of sheets 10 have been deposited. Stacks 170, 180, 190 are likewise provided with elevating mechanisms including motors 172, 182, 192 which, under the control of respective microswitches (not shown) similar to switch 102, operate in reverse to motor 162, namely to lower the stacks as the sheets accumulate thereon.

A particular advantage of the two-detector system of FIGURE 6 is that the suppression of spurious defect indications at the inter-sheet gaps by means of an auxiliary light source, as described in conjunction with FIGURES 1 and 1a, is considerably simplified. Only one lamp 38′ or 38″ is required in each detector so long as their positioning is such that their light rays do not strike the same part of a sheet on their way to the respective photocells.

The general arrangement of FIGURE 6 is representative of a variety of systems for selectively switching a succession of sheets into a plurality of receptacles under the control of one or more photo-electric scanners. It will be understood, for example, that baffle 106 could be set by a detector of low sensitivity (high-level cutoff) while baffle 107 responds to the output of a detector of high sensitivity (low-level cutoff) so as to deposit grossly defective sheets (rejects) on stack 170, slightly defective sheets ("seconds") on stack 180 and perfect sheets on stack 190. Again, the sheets in stack 160 may already have undergone preliminary sorting to eliminate all specimens with major irregularities (e.g. spots on both sides and/or perforations) so that stack 170 and 180 will receive only sheets having one good side. Also, the number of receptacles could be increased to provide still greater versatility in discriminating between defects of different nature and/or location. These various possibilities will become more fully apparent in the subsequent description of specific distributor-control systems given in connection with FIGURES 10 and 11.

FIGURE 7 shows a modified transport mechanism in which two supporting elements 112 and 113, each similar to the triangular band 15 in FIGURE 1, are positioned on opposite sides of a scanning region 17 to enable the testing of a continuous web 100 as shown in FIGURE 2 (or of successive sheets 10 as shown in FIGURE 1) by translumination. Each of the supporting bands 112, 113 surrounds a respective suction box 110, 111 which draws the sheet material 100 into firm contact not only with the band, but also with a fixed auxiliary support, such as a transparent plate 116, advantageously provided in the region of the scanning sweep. A light beam 115, swept along transverse line 17 in the manner described in connection with FIGURES 1, 2 and 4, impinges upon the photoelectric transducer 24 after traversing the sheet material 100. If the sheet material is opaque, the only defects detectable by this system of FIGURE 7 will be the occurrence of holes; with transparent or translucent material, however, spots and wrinkles will also show up.

Where the sheet material 100 is an endless or long web of sufficient tensile strength, it is desirable to minimize friction between the web and the supporting plate 116 by stretching the web taut in the region of the scanning sweep. This may be accomplished by imparting to band 113 a speed somewhat higher than that of band 112 and of conveyor belts 11; as a result, the web will sag slightly between the band 113 and the belt 11 immediately following, as illustrated at 114. If the web is strong enough, the supporting plate 116 may even be omitted.

FIGURE 8 shows the clipper stage 37, with its input leads 26, blocking lead 151 and output leads 92, connected to a defect indicator 35 comprising an audible alarm device 130, shown schematically as a bell, and a visual signaling device 131, illustrated as a lamp. Connected across the output leads 92, in series with a battery 132, is the winding of a relay 133 which, when energized, is locked over its left-hand contact which is connected in series with a manually operable circuit breaker 134. The two contacts of relay 133 connect battery 132 across the winding of a slow-operating relay 135 adapted to connect the lamp 131 in parallel with the bell 130, the latter being energizable from the same battery via the inner contact of relay 133. The delay time of relay 135 should be so chosen that a defective sheet portion, after having actuated the clipper 37 to energize the relay 133 and to sound the alarm 130, will have passed out of the detector housing into a readily viewable position, downstream from line 17, at the instant when the lamp 131 lights up; the operator, upon hearing the bell, will watch for the lighting of the lamp to inspect the defect and will then reset the indicator by depressing the circuit-breaker button 134, thereby de-energizing both relays 133 and 135.

The indicator associated in FIGURE 9 with the clipper 37 comprises a source of alternating current 144 for energizing a sound head 143 as well as an electronic counter 147 in response to an output signal of the clipper stage. The counter may have an output circuit, indicated at 148, for giving an alarm, arresting the sheet-feeding mechanism or performing some other operation after a predetermined number of defects have been registered within a predetermined length of time. The sound head 143 is cooperating in the usual manner with a magnetic tape 145, which is driven at a speed proportional to the feeding speed of web 100, to indicate directly the location of any defect on the web so as to facilitate subsequent excision of the faulty portions thereof. It will be understood that the tape 145 is representative of a large variety of elongated recording media adapted to be controlled by the output of a defect detector according to the invention.

FIGURE 10 shows a circuit arrangement for controlling a pair of baffles 106 and 107, as illustrated in FIGURE 6, in response to signals arriving over two input leads 295a, 295b, representing defects of different character and/or location. More particularly, FIGURE 10 relates to a system for testing sheets from which the perfect sheets have already been separated. In this system, the distributor comprising the baffles 106 and 107 is adapted to discriminate between sheets 10 having a forward half 10a free from imperfections irrespective of the condition of a rear half 10b, in which case both baffles 106, 107 will be unoperated and the sheets will advance toward the stack 190 of FIGURE 6, while sheets with one or more defects in their forward half 10a only will be directed into the stack 180 by the baffle 107 and sheets with defects in both halves 10a, 10b will be deflected into the stack 170 by the baffle 106. The sheet portions 10a, 10b do not necessarily have to be equal to each other.

In FIGURE 10 the baffles 106, 107 are controlled by respective solenoids 206, 207 and are provided with restoring springs 208, 209 tending to maintain them in their substantially horizontal position as illustrated. The effective sheet length g, e.g. as measured between trailing edges of successive sheets, corresponds to the spacing of the operating edge of baffle 106 from the scanning line 17. FIGURE 10 also shows the blocking lead 151 of clipper 37, which is controlled by the transducer 24. This blocking lead is energized with current from the photocell 202 which, in turn, is supplied by a battery 201 and is positioned in line with a lamp 202'. This line crosses the scanning line 17, thus producing a pulse in the photocell during the passage of a gap between successive sheets. This pulse, having a negative sign, is thus applied to the clipper stage 37, suitably broadened if necessary by the resistance-capacitance circuit 152, 153 of FIGURE 5, and will coincide with the time interval during which the transducer 24 receives substantially no input as the beam 20 falls into a gap.

A gating circuit 210 is periodically triggered by the pulses on lead 151 to measure two intervals corresponding, respectively, to the transit times of sheet halves 10a, 10b as seen by the beam 20. This negative pulse is applied, through a condenser 211, to the left-hand triode 212b of a monostable multivibrator 212 and also to one of the two grids of a cathode-follower tube 213b. The grid of the right-hand multi-vibrator triode 212a, tied to one of two grids of another cathode-follower tube 213a, is conductively connected to the plates of tube 212b by a voltage divider 214 and is normally biased to cutoff by a battery 215; the plate of tube 212a is coupled through a condenser 216 to the grid of tube 212b which is connected to ground through a grid-leak resistor 217. Condenser 216 and resistor 217 are so dimensioned that the appearance of a negative pulse on the grid of triode 212b will cut off that tube and render tube 212a conductive for a period equaling the transit time of sheet portion 10a; thereafter the multi-vibrator reverts to its normal condition until another negative pulse on lead 151 indicates the end of sheet portion 10b. Operating current is supplied to the tubes 212a, 212b and 213a, 213b by a battery 218 connected between ground and a positive busbar 219; this busbar is connected to the plates of the multivibrator triodes 212a, 212b via respective resistors 220a, 220b and is also tied directly to the plates of tubes 213a, 213b. Ground is connected directly to the multivibrator tubes and through resistors 221a, 221b to the cathodes of tubes 213a, 213b. The other grids of these latter tubes are tied together to output lead 92" of clipper 37, the other output lead 92' of which is grounded, and are biased to cutoff by a battery 222 in series with a resistor 223.

The output lead 295a of the gating network 210 extends from the cathode of tube 213a to ground through a relay 223a having its inner armature and front contact in circuit in the other output lead 295b, the latter extending from the cathode of tube 213b to the ground through a relay 223b. The two armatures of relay 223a and the sole armature of relay 223b are adapted to be mechanically latched in attracted position by respective dogs 224a, 224b controlled by solenoids 225a, 225b. A shaft 230, carrying three contact disks 231, 232, and 233, is driven from motor 34 via a chain drive 226 in step with the feeding mechanism 193 (FIGURE 6) which is coupled with the same motor by a chain drive 227. Contact disk 231 has a small conductive peripheral portion 231' cooperating with a brush 231" which is connected in parallel to the front contacts of the sole armature of relay 223b and of the outer armature of relay 223a. Disk 232 has a similar conductive portion 232', slightly lagging behind conductive portion 231' of disk 231, which cooperates with a brush 232" connected through solenoids 225a, 225b, in series to positive busbar 219. A relay 234, connected between busbar 219 and the outer armature of relay 223a, has three armatures of which the innermost one is connected to a brush 233" cooperating with the largely conductive periphery of disk 233, this periphery being interrupted only by a non-conductive portion 233' substantially in line with conductive portion 231' of disk 231. The armature of relay 223b is connected to busbar 219 through solenoid 206 and, in parallel therewith, to a switch 206' having a make contact connected to brush 233". Shaft 230, grounded by means of a brush 235, is positively coupled with another shaft 240 via a step-up transmission here shown as two meshing gears 236, 237. Shaft 240 carries a disk 241 circled by a magnetic band 242 which cooperates with a recording head 243, an erasing head 244 and a pick-up head 245. Switch 206' is controlled by solenoid 206.

Recording head 243 is connectable to a source of alternating current by the two outermost armatures and front contacts of relay 234. Erasing head 244 is connected across battery 218 in series with a resistor 246. Pick-up head 245 is adapted to energize a relay 247, having an armature and front contact connected between ground and busbar 219 in series with solenoid 207, via a translator stage 250 shown to comprise an amplifier 251, a transformer 252 with its primary winding in circuit between the output lead of the amplifier and its source of operating potential on lead 219, and a rectifier 253 shunted by a condenser 254 in series with the transformer secondary and the winding of relay 247.

The conductive portion 231' of contact disk 231 is so positioned that it will pass underneath brush 231" at the instant when the leading edge of a sheet 10 approaches the operating edge of baffle 106. Furthermore, the ratio of transmission 236, 237 and the spacing of heads 243, 245 is such that a point on magnetic band 242 will traverse that distance during the time required for a given sheet portion to pass the distance $h$ between baffles 106 and 107.

As long as the sheets 10 scanned by the apparatus 24, 37 are free from measurable imperfections, the timer stage 210 will produce no output even though the multivibrator 212 reverses periodically its conductivity; neither of the solenoids 206, 207 will be energized under these conditions. Similarly, a sheet 10 carrying a defect only in its rear portion 10b will cause no change in the position of baffles 106, 107 since the temporary grounding of conductor 92" by clipper 37, while rendering tube 213b conductive, will fail to energize the relay 223b as its circuit is open at the inner armature of relay 223a. This is so because the pulse on lead 92" coincides with a period during which the tube 213a is disabled by the multivibrator 212 and therefore incapable of being rendered conductive by that pulse. If, however, a dark spot or a hole appears in the forward half 10a of a sheet, conductor 92" will be grounded at an instant when the multivibrator 212 is in its alternate condition of conductivity so that tube 213a can pass current in response to the pulse, tube 213b remaining cut off. The operation of tube 213a energizes the relay 223a and causes it to attract its armatures which, being mechanically ganged, are held latched by the dog 224a. This action prepares an operating circuit for the relay 223b which would be energized, by the actuation of tube 213b, in the event of a subsequent occurrence of a pulse on conductor 92" indicating a defect in the rear portion 10b of the same sheet.

After an interval sufficient to let the leading edge of the scanned sheet approach the baffle 106, disk 231 grounds its brush 231" and, if relay 223b is operated at this time, energizes tht solenoid 206 to swing the baffle 106 clockwise about its horizontal axis. Solenoid 206 closes a holding circuit for itself at contact 206', this holding circuit being broken only after a substantially complete revolution of shaft 230 when the insulating portion 233' of disk 233 removes ground from brush 233". By this means, the baffle 106 is held in sheet-deflecting position for a period sufficient to enable an entire sheet to pass under it into the associated receptacle.

Simultaneously with the energization of solenoid 206 if relay 223b is operated, and independently therefrom if this is not the case, the grounding of brush 231" also closes an operating circuit for relay 234 through the outer armature of relay 223a. Relay 234, at its innermost armature, locks to ground on brush 233", even as solenoid 206 if energized locks to the same ground, whereupon disk 232 briefly grounds portion 232" to energize the solenoids 225a, 225b for unlatching the armatures of relays 223a and 223b. The operation of relay 234 causes a magnetic pulse to be impressed by the recording head 243 on the band 242, the length of this pulse corresponding to the time required to traverse the distance $g$. If the scanned sheet did not exhibit any defects in its rear portion 10b so that baffle 106 remained unoperated, it will have covered the distance $h$ from baffle 106 to baffle 107 during the time required for this magnetic pulse to reach the pick-up head 245. It will be understood that this time may be equal to or different from the duration of the pulse itself, i.e. from the time required to traverse the distance $g$. Next, the magnetic pulse picked up by head 245 is rectified in the control circuit 250 to energize the relay 247 so that solenoid 207 is actuated and baffle 107 is turned to deflect the oncoming sheet. Again, the baffle remains off-normal for a time sufficient to let the entire sheet pass underneath.

Reference is now made to FIGURE 11 for a description of a modified distributor comprising three baffles 105, 106, 107. These baffles are controlled by respective solenoids 305, 306, 307 acting against the force of restoring springs 304, 308, 309. The distance between scanning line 17 and the operating edge of baffle 105 is given as $u$; the distances between the edges of baffles 105, 106 and of baffles 106, 107 are given as $v$ and $w$, respectively. The length of each sheet 10 is designated $s$ and, with the arrangement illustrated, may be varied between certain limits.

It will be assumed that it is desired to scan the sheets 10 for defects occurring on either their right-hand halves 10c or their left-hand halves 10d (as viewed in their direction of travel). Moreover, it will be assumed that the task of the system of FIGURE 11 is to discriminate between sheets having defects on their right-hand halves only, on their left-hand halves only, on both halves, or on neither half.

In FIGURE 11 the negative blocking pulse for lead 151 is derived from the anode of an auxiliary photocell 302 which is illuminated by a light source 302', through suitable optical beam-forming means not shown, during precisely the interval when the light rays from mirror 22 fall into the gap between sheets 10 instead of being deflected back to transducer 24. The shaft 310 of mirror 22 is positively coupled, via a step-up transmission shown as a chain drive 311, with the shaft 312 of a rotary interrupter 313. Interrupter 313 is connected to the output lead 92' of clipper 37, the other output lead 92" thereof being connected to positive potential. Two brushes 314c, 314d contact the periphery of the interrupter 313, the speeds of the interrupter and of the mirror 22 being so correlated that brush 314c will be connected to lead 92' during the first half of each scanning sweep, i.e. while sheet half 10c is scanned, whereas brush 314d is connected to that conductor during the second half of the sweep, thus during the scanning of sheet half 10d. Brushes 314c, 314d are connected via leads 395c, 395d to ground through the winding of respective slow-releasing relays 315c, 315d. Another relay 316 is energizable by a positive pulse on the cathode of photocell 302, via an amplifier 317, in a circuit including the innermost right-hand armatures and front contacts of relays 315c, 315d in parallel. The left-hand armatures and front contacts of relays 315c and 315d are connected in respective holding circuits for these relays extending in parallel through the left-hand back contact and armature of relay 316 to busbar 319 connected to the positive terminal of a grounded battery 318.

The remaining three armatures of relays 315c and 315d and associated contacts are connected in cascade, in series with the right-hand armature and front contact of relay 315, between busbar 319 and a magnetic recording unit 343 comprising three heads schematically indicated at 343A, 343B, 343C. Recording unit 343 cooperates with an endless magnetic band 342 driven from motor 34 (not shown in FIG. 11) via a chain drive 326. Three pick-up heads 345A, 345B, 345C are positioned close to band 342 at staggered locations and in line with recording heads 343A, 343B, 343C, respectively. The distance between recording unit 343 and pick-up head 345A is given as $x=k(u-s)$, that between pick-up heads 345A and 345B as $y=kv$, and that between heads 345B and 345C as $z=kw$, $k$ being a constant which is determined by the relative speeds of band 342 and sheets 10 and which may have the value 1 if these speeds are equal. The position of unit 343 is adjustable, as indicated by the arrow 320, to allow for different sheet lengths $s$ and to take into account the response time of the relays.

Solenoids 305, 306, and 307 are connected between ground and positive potential on busbar 319 by way of armatures and front contacts of respective slow-releasing relays 347A, 347B, 347C which are energizable, through the intermediary of associated control circuits 350A, 350B, 350C similar to circuit 250 of FIG. 10, in response to signals from pick-up heads 345A, 345B, 345C. The system also includes an eraser head 349 for the band 342 which may be a permanent magnet, or an electromagnet energized from any suitable source.

The operation of the system of FIGURE 11 is as follows:

As long as no defect is detected by the scanner 22, 24, none of the relays and solenoids is operated and the sheets pass over all the baffles 105, 106, 107 toward a receptacle (not shown) for perfect specimens. It may be mentioned that the end result would be the same if the winding of relay 316 were connected directly to ground, except that the relay would then attract its armatures needlessly and ineffectually every time the photocell 302 is energized; it will be seen, however, that no path exists to the recording unit 343 in the unoperated condition of both relays 315c, 315d.

If a positive pulse appears on lead 395c, indicating a defect in the right-hand half 10c of a sheet, relay 315c is energized and locks over its own left-hand armature and that of relay 316. After the sheet 10 has fully passed under the scanner, the photocell 302 operates relay 316 to close a path to recording head 343B via right-hand armature and front contact of relay 316, second armature from right and back contact of relay 315d, corresponding armature and front contact of relay 315c. A short pulse is now impressed upon the band 342, relay 315d maintaining its armature attracted for a sufficiently long period after its holding circuit is broken at the back contact of relay 316. After an interval sufficient to allow the leading edge of the sheet to arrive at baffle 106, head 345B picks up the pulse and causes solenoid 306 to operate.

The delayed release of relay 347B maintains the baffle 106 off-normal long enough to let at least a major portion of the tested sheet 10 pass underneath.

Similarly, if the relay 315d alone is operated in the course of a scanning cycle to indicate one or more defects in left-hand sheet half 10d, the energization of relay 316 by photocell 302 excites the recording head 343C via a path extending from busbar 319 over the right-hand armature and front contact of relay 316, outermost armature and front contact of relay 315d, corresponding armature and back contact of relay 315c to unit 343. After an interval sufficient to allow the scanned sheet to reach the edge of baffle 107, a pulse impressed by head 343C on the magnetic band 342 is picked up by head 345C to cause operation of relay 347C, thereby energizing the solenoid 307 to turn the baffle 107 into sheet-deflecting position.

If both relays 315c and 315d are operated in a single scanning cycle, a path is prepared for the energization of recording head 343A by way of the right-hand armature and front contact of relay 316, third armature from right and front contact of relay 315d, corresponding armature and front contact of relay 315c. The recorded pulse will be picked up by the head 345A, after a short interval needed for the forward edge of the sheet to approach baffle 105, whereupon this baffle is operated by the solenoid 305 under the control of the signal translator 350A and the relay 347A.

If the speed of the sheet-dispensing mechanism (element 193 in FIGURE 6) relative to that of the sheet-feeding conveyors and the magnetic band 342 is maintained constant as the length $s$ of the sheets is changed, the inter-sheet gaps will vary in size while the effective sheet spacing $g$ remains the same. In this case the operating period of relays 347A, 347B, 347C may safely equal the transit time of the longest sheet. If, however, the sheet dispenser is accelerated with respect to the rest of the mechanism when shorter sheets are to be scanned, in order to maintain the gap between sheets substantially constant, then the operating period of the relays should correspond to the transit time of the shortest sheet. Naturally, the unit 343 must be displaced with any variation in sheet length to maintain the correct relationship $x=k(u-s)$.

The system of FIGURE 11 may, of course, be readily modified to discriminate between front and rear portions of a sheet, as described in connection with FIGURE 10, rather than between right-hand and left-hand halves. For this purpose it is merely necessary to replace the interrupter 313 by a gating device similar to that shown at 210 in FIGURE 10 and controlled by the output of photocell 302. Naturally, the interrupter 313 is representative of any mechanical or electronic means for synchronizing the operating periods of relays 315c and 315d, or of equivalent switching devices, with the sweep of the scanning beam 20.

If desired, the auxiliary lamp 302' and/or the photoelectric receiver 302 may be doubled, as illustrated in FIGURES 1a and 2a, respectively, for the lamps 38', 38" and for the receivers 24', 24", in order to prevent the appearance of spurious pulses on lead 151 and in the input of amplifier 317 in response to a perforation in any sheet 10.

It will be understood that the embodiment shown in the drawings and described above are merely illustrative and that, within the limits of compatibility, features of different illustrated systems may be combined with or substituted for one another, these embodiments being otherwise susceptible of various modifications and adaptations without departing from the spirit and scope of the invention as defined in the appended claims.

It will be further understood that, although the embodiments shown in the drawings and described above may be successfully applied for testing sheet materials of any width, they are primarily intended for accurately testing webs of very great width, generally exceeding 40 cm., as has to be done particularly in paper mills before the material is being shipped. Even though there have previously been apparatus for detecting optically noticeable defects on narrow webs by scanning such webs with light beams and evaluating the results by photo-electric means, and even though there have also been theoretical proposals of methods of photoelectrically testing wider webs, none of these known methods has, owing to various serious deficiencies, ever been actually and successfully applied for testing wide webs. It first required the above described combinations of the elements and features according to the present invention before a succession of individual sheets or continuous webs of almost any width could be successfully and economically tested by photoelectric means. While prior to this invention all paper mills and similar manufacturing plants still required the paper or other sheet materials to be tested by the human eye, the application of a single photoelectric apparatus according to the invention replaces the work of more than 40 persons which were previously needed for inspecting the material and manually sorting out the good from the bad. Though the testing results achieved by the new apparatus are also far more accurate and reliable than those achieved by the previous methods, whether entirely manual or semiautomatic, the results already attained in actual practice in routine operation indicate that the output of these apparatus may be further increased without difficulty. It is therefore evident that the results attainable by the present invention and its combination of the features and elements described will be of the greatest advantage in various fields of industry.

Having thus fully disclosed my invention, I claim:

1. An apparatus for detecting optically ascertainable imperfections on sheet material, comprising feed means for advancing the sheet material to be tested along a predetermined path, a light source of high intensity for producing a narrow beam to form a light spot of predetermined size, scanning means for repetitively sweeping said light spot across said path at a rate which is high compared with the speed of advance of said sheet material, photoelectric transducer means operatively aligned with said source for receiving light from said beam directed toward said transducer means by said material, said transducer means being adapted to produce an output voltage substantially proportional to the received light, clipper means connected to said transducer means for suppressing said output voltage up to a predetermined level and deriving from voltage peaks exceeding said level a succession of pulses corresponding to imperfections of predetermined minimum magnitude in the material scanned, and indicator means controlled by said clipper means for signaling the occurrence of said imperfections in response to said pulses.

2. An apparatus according to claim 1 wherein said indicator means comprises audible alarm means operable substantially instantaneously upon the scanning of an imperfection, visual signaling means, and delay means for deferring operation of said visual signaling means for a time sufficient to enable said imperfection to pass from the region of the beam sweep to an observation point located further downstream along said path.

3. An apparatus according to claim 1, for use with sheet material in the form of an elongated web, wherein said indicator means comprises an elongated recording medium, mechanism for advancing said recording medium in step with said web, and marking means triggerable by said pulses for registering the occurrence of said imperfections on said recording medium at locations corresponding to the positions of said imperfections on said web.

4. An apparatus according to claim 1 wherein said light source comprises a constant-voltage generator and a gas-filled tube of a high light intensity energized by said generator.

5. An apparatus according to claim 1 wherein said feed means comprises air-aspirator means positioned to act upon said sheet material in the vicinity of said scanning means and an air-permeable transport member movably interposed between said path and said air-aspirator means.

6. An apparatus according to claim 1, adapted for the testing of a succession of spaced-apart sheets of limited length, wherein said feed means includes dispenser means for delivering said sheets to said path separated from one another, further comprising suppressor means positioned adjacent said path and controllable by said sheets for blocking the generation of said pulses during an interval during which said beam sweeps a gap between said sheets said suppressor means comprising auxiliary radiant means positioned at the side of said sheets remote from said transducer means for directing light rays onto said transducer means by way of said gap only.

7. An apparatus according to claim 6 wherein said auxiliary radiant means comprises means for emitting light toward said transducer means from a plurality of locations along a line transverse to said path.

8. An apparatus according to claim 1 wherein said feed means comprises a movable, contrastingly colored supporting member for said sheet material.

9. In an apparatus for detecting optically ascertainable imperfections on sheet material, in combination, feed means for advancing the sheet material to be tested along a predetermined path, scanning means for causing a beam of light to sweep repetitively across said path, signaling means responsive to light from said beam rejected by said sheet material for indicating the occurrence of an imperfection, an air-permeable endless member driven in step with said feed means and supporting said sheet material in the region of said scanning means, and a suction box having an open side spanned by said member along a portion of said path for drawing said sheet material into firm contact with said member.

10. The combination according to claim 9 wherein the sheet material consists of a succession of individual sheets separated by gaps, said signaling means including photoelectric transducer means positioned to receive light from said beam reflected by said sheets, further comprising auxiliary radiant means positioned in said box for irradiating said transducer means upon the passage of any of said gaps across said open side, said member and the interior of said box forming a substantially non-reflecting background for said sheets with respect to said beam, said member being provided with apertures wide enough to enable the passage of a sufficient amount of light from said radiant means to said transducer means to suppress the indication of an imperfection upon the passage of said gaps.

11. The combination according to claim 10 wherein the intensity of said source and the sensitivity of said receiver means are so selected that operation of said signaling means is inhibited only in response to the simultaneous impingement of light rays from said source upon said receiver means across a plurality of transversely spaced-apart locations along said path.

12. An apparatus for distributing a succession of sheets in accordance with optically ascertainable markings on said sheets, comprising dispenser means for successively releasing said sheets, feed means for spacedly advancing said sheets along a given path, scanning means for causing at least one beam of light to sweep repeatedly across said path, a plurality of signaling circuits selectively energizable by said scanning means in response to light rays reflected by different portions of said sheets for producing respective output signals upon the occurrence of said markings thereon, a plurality of baffles in the path of said sheets beyond said scanning means for selectively directing said sheets to a plurality of different destinations in response to respective output signals, signal-responsive means controlled by said signalling circuits for storing said output signals, until a predetermined instant in the operating cycle of said feed means, and control means actuatable by said signal-responsive means for operating said baffles at said instant in a manner determined by said output signals, said baffles being spaced from one another in the direction of advance of said sheets.

13. An apparatus according to claim 12 wherein said signaling circuits are provided with gating means for periodically rendering each of said circuits effective to produce a specific type of signal in response to a marking encountered during different portions of a scanning cycle.

14. An apparatus according to claim 12 wherein said signalling circuits include first transducer means responsive to light reflected from one sheet surface and second transducer means responsive to light reflected from the opposite sheet surface.

15. An apparatus according to claim 14 wherein each of said transducer means is provided with an auxiliary light source positioned to direct to it sufficient light through a gap between said sheets for suppressing said output signal upon the passage of said gap, the path of light to each transducer means from the associated auxiliary light source traversing different portions of each sheet.

16. An apparatus for distributing a succession of sheets in accordance with optically ascertainable markings on said sheets, comprising dispenser means for successively releasing said sheets, feed means for spacedly advancing said sheets along a given path, scanning means for causing a beam of light to sweep repeatedly across said path, receiving means responsive to light from said beam reflected by said sheets for producing an output signal upon the occurrence of one of said markings, baffle means in the path of said sheets beyond said scanning means for changing the destination of said sheets in response to said output signal, gap-detecting means positoned in the path of said sheets for signaling the entrance of the leading edge of a sheet into the sweep of said beam, storage means for said output signal adapted to delay the application thereof to said baffle means, and timer means controlled by said gap-detecting means for triggering said storage means into a release of said output signal to operate said baffle means at the end of a predetermined interval after the entrance of said leading edge into said sweep.

17. An apparatus for detecting optically ascertainable imperfections on sheet material, comprising feed means for advancing the sheet material to be tested along a predetermined path, a light source of high intensity, stationary focusing means positioned to receive light rays from said source for producing a narrow beam forming a light spot of predetermined size at a predetermined distance from said source on the surface of said sheet material, movable reflector means optically aligned with said focusing means for changing the direction of said beam, scanning means coupled with said reflector means for repetitively sweeping said light spot across said path at a rate which is high compared with the speed of advance of said sheet material, photoelectric transducer means operatively aligned with said source for receiving light from said beam directed toward said transducer means by said material, said transducer means being adapted to produce an output voltage substantially proportional to the received light, clipper means connected to said transducer means for suppressing said output voltage up to a predetermined level and deriving from voltage peaks exceeding said level a succession of pulses corresponding to imperfections of predetermined minimum magnitude in the material scanned, and indicator means controlled by said clipper means for signaling the occurrence of said imperfections in response to said pulses.

18. An apparatus according to claim 17 wherein said focusing means includes a light gate between said light source and said reflector means for cutting off marginal light rays of said beam and, adjacent said path, an elongated cylindrical lens extending across said path for further limiting the width of said beam in the direction transverse to its sweep.

19. An apparatus for detecting optically ascertainable imperfections on sheet material, comprising feed means for advancing the sheet material to be tested along a predetermined path, a light source of high intensityy, stationary focusing means positioned to receive light rays from said source for producing a narrow beam forming a light spot of predetermined size at a predetermined distance from said source on the surface of said sheet material, said focusing means including an objective adjacent said light source provided with a diaphragm for cutting off marginal light rays of said beam and an elongated cylindrical lens extending across said path adjacent said surface for further limiting the width of said beam in the direction of said advance, movable reflector means positioned beyond said slot diaphragm for directing light rays from said light source passed by said focusing means onto said cylindrical lens, scanning means coupled with said reflector means for repetitively sweeping said beam along said cylindrical lens and displacing said spot across said surface at a rate which is high compared with the speed of advance of said sheet material, photoelectric transducer means positioned to receive light from said beam reflected by said surface and adapted to convert the light so received into an output voltage, and indicator means controlled by said transducer means for registering abnormal values of said voltage representative of the occurrence of imperfections in the material scanned.

20. An apparatus according to claim 19 wherein said transducer means comprises at least two photoelectric receivers spaced from one another in axial direction of said cylindrical lens.

References Cited in the file of this patent

UNITED STATES PATENTS

| | | |
|---|---|---|
| 2,429,331 | Sachtleben | Oct. 21, 1947 |
| 2,518,948 | Simmon | Aug. 15, 1950 |
| 2,570,288 | Todd | Oct. 9, 1951 |
| 2,750,519 | Summerhayes | June 12, 1956 |
| 2,807,704 | Allen et al. | Sept. 24, 1957 |
| 2,884,130 | Bosch | Apr. 28, 1959 |
| 2,891,438 | Fuhrmann et al. | June 23, 1959 |
| 2,904,174 | Emerson | Sept. 15, 1959 |
| 2,933,185 | Coleman | Apr. 19, 1960 |

UNITED STATES PATENT OFFICE
CERTIFICATE OF CORRECTION

Patent No. 3,023,900                 March 6, 1962

Richard Thier

It is hereby certified that error appears in the above numbered patent requiring correction and that the said Letters Patent should read as corrected below.

In the heading to the printed specification, line 8, for "Apr. 18, 1958" read -- Apr. 11, 1958 --.

Signed and sealed this 4th day of September 1962.

(SEAL)
Attest:

ERNEST W. SWIDER
Attesting Officer

DAVID L. LADD
Commissioner of Patents